J. L. KIMBALL.
STEAM PRESSURE REGULATING VALVE.
APPLICATION FILED MAY 19, 1917.
1,236,093.
Patented Aug. 7, 1917.
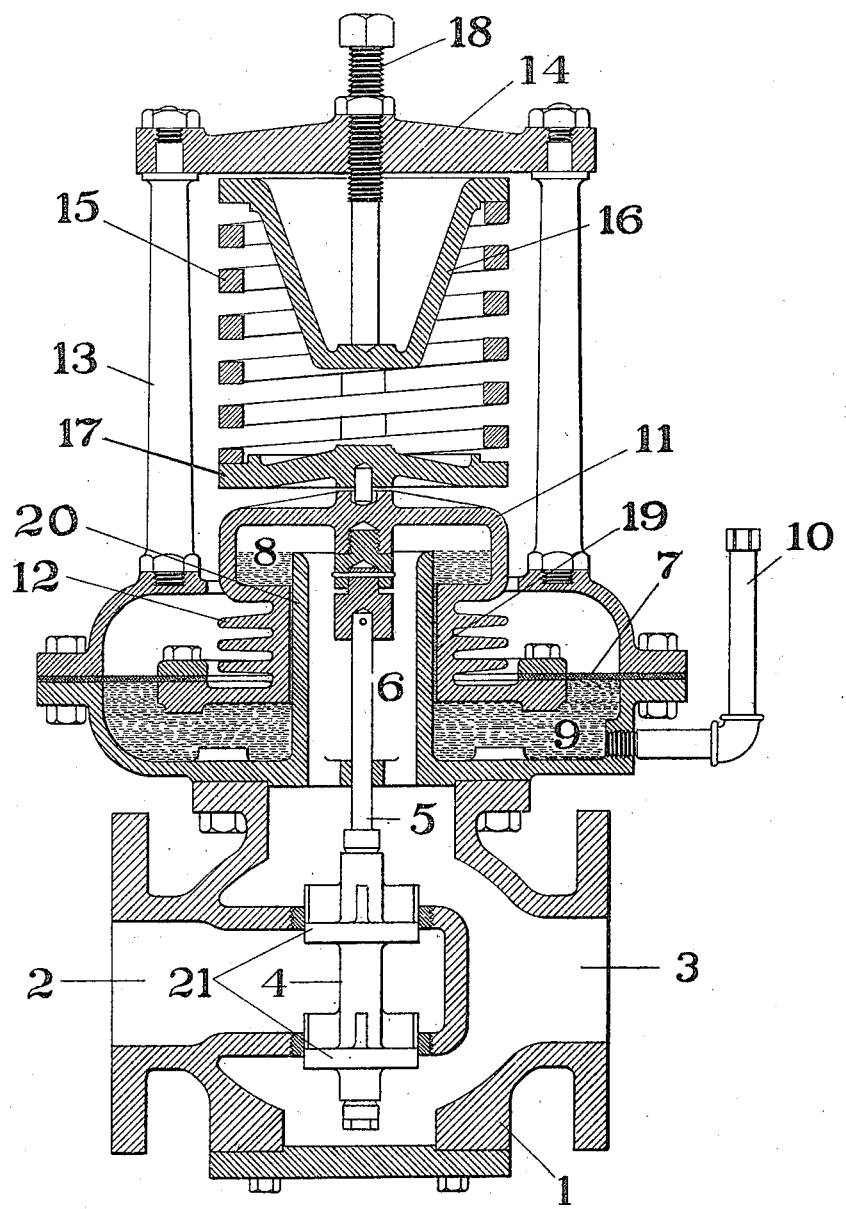
Witnesses
George McTrauel
Laura W. Davis.
Inventor
James L. Kimball

UNITED STATES PATENT OFFICE.

JAMES LEWIS KIMBALL, OF SALEM, MASSACHUSETTS, ASSIGNOR TO WALTER G. RUGGLES COMPANY, OF BOSTON, MASSACHUSETTS.

STEAM-PRESSURE-REGULATING VALVE.

1,236,093.

Specification of Letters Patent.   Patented Aug. 7, 1917.

Application filed May 19, 1917.   Serial No. 169,809.

*To all whom it may concern:*

Be it known that I, JAMES LEWIS KIMBALL, a citizen of the United States, residing at Salem, in the county of Essex and State of Massachusetts, have invented certain new and useful Improvements in Steam-Pressure-Regulating Valves, of which the following is a specification.

My invention relates to steam pressure regulating valves of the type having a double balanced puppet actuated by a diaphragm with a spring or weight as the counteracting force.

The object of my invention is, to provide an improved type of steam pressure regulating valve for use in connection with turbines for maintaining steam of a uniform pressure, slightly above the atmosphere, for sealing the low pressure bearing against the admission of atmospheric pressure, and, also a valve which can be easily adjusted for use as a relief valve for maintaining a uniform pressure of steam, slightly above the atmosphere in the high pressure bearing of turbines, and to relieve any excess pressure to one of the lower stages of the machine when the pressure is below the atmosphere.

Regulating valves for this service must be sensitive and must respond to the slightest variation of pressure in the bearing, regardless of any variation in the initial pressure or the volume of steam to be regulated.

To accomplish these results, I have produced a steam pressure regulating valve, having the following advantages:—

The drawing shows a vertical sectional view of my invention.

In the construction of this valve, I use a rubber diaphragm of large effective area, as rubber is more flexible than metal or other material used for this purpose, and, therefore, responds more readily to slight changes in pressure.

For convenience in installing, I prefer to locate the diaphragm chamber above the valve casing, but, in doing so, it is necessary to provide a water seal to protect the rubber diaphragm against injury by coming in contact with the live steam.

Another advantage in locating the diaphragm above the valve casing is, that it affords means of limiting and maintaining a uniform static head of water on the under side or pressure side of the diaphragm. It is the usual practice to construct steam pressure regulating valves having rubber diaphragms, with the diaphragm located below the valve casing with a small feeling pipe connecting the diaphragm chamber with the reduced pressure side of the valve, or, the pressure may be felt through a drop leg or conduit extending from the valve casing to the diaphragm chamber in same way as if the valve, shown by the drawing, was turned upside down.

This construction has the advantage, in that, the water of condensation will find its way by gravity into the diaphragm chamber and, thereby protect the diaphragm against injury from coming in contact with the live steam. It also has the disadvantage that with a large diaphragm having considerable travel, it is impossible to maintain anything like a uniform static head or pressure on the diaphragm. The variation in the static head caused by the movement of the diaphragm oftentimes amounts to more than the total pressure to be maintained.

Although my invention is particularly adapted for use in connection with steam turbines, I do not wish to limit its scope to this particular service. Referring the drawing (1) is the valve casing; (2) the inlet when valve is used as a reducing valve, (3) is the inlet when used as a relief valve, in which case puppet (4) must be reversed on valve stem (5). A conduit opening (6) extends from the valve casing to a point above the diaphragm (7) terminating in a condensing chamber (8) formed in the top of pressure cap (11) a circular hole being cut in the center of the diaphragm, said hole being closed by the pressure cap clamped to the inner edge of the diaphragm. Said pressure cap has cooling flanges (12) for cooling the condensed water as it enters the diaphragm chamber (9). (10) is a pipe connection for filling the diaphragm chamber with water before putting the valve in service. (13) represents tie-rods for holding spider (14). A spring (15) spring caps (16) and (17) adjusting screw (18) are shown respectively.

While the drawing shows the counteracting force to be a spring, I do not wish to limit the scope of my invention to the use of a spring, as a weight may be used either direct or through the medium of a fulcrum lever.

As a reducing pressure regulating valve, it will be seen that tension placed on the spring (15) will force pressure cap (11) downward, thereby opening the puppet (4) allowing the pressure to pass to the low pressure side of the valve, the low pressure side of the valve being in communication with the diaphragm chamber (9) through conduit opening (6) and passage (19) which is formed by making the pressure cap a loose fit over conduit wall (20). The condensed steam acting on the under side of diaphragm (7) and pressure cap (11) will be maintained in pressure equal to the amount of tension placed upon the spring. It will be noted, that puppet (4) is of the piston type without seats, having valved portions (21) which are identical in size and control double openings from the inlet to the outlet side of the valve, which permits it to be reversed on the valve stem (5) when used as a relief valve. The inlet, as a relief valve being at (3) any increase in pressure above what the valve is adjusted for, will be communicated to the diaphragm chamber (9) through conduit opening (6) and passage (19) thereby acting on the under side of diaphragm (7) and pressure cap (11) forcing the pressure cap upward and opening puppet (4) and discharging the excess pressure to the outlet side of the valve. By referring to the drawing, it will be seen, that any movement of the diaphragm (7) tending to increase the static head allows the water of condensation to flow over the top of conduit walls (20) and be discharged through conduit connection (6) into the valve casing, and, any movement in the opposite direction tending to decrease the static head, will be compensated by condensation in the condensing chamber formed in the top of the pressure cap.

Having fully described my invention, what I claim as new and desire to secure by Letters Patent of the United States is:—

1. The combination of a valve casing with a therein contained valve, having a diaphragm located above the valve casing and a conduit from the valve casing extending through an opening in the diaphragm and a cylindrical pressure cap mounted over said opening, said conduit permitting the pressure in the valve casing to enter the diaphragm chamber and preventing the water in said diaphragm chamber from discharging therefrom, and, maintaining a limited static head of water on the under side of the diaphragm.

2. The combination of a valve casing with a therein contained valve, a diaphragm and its casing secured to the top of the valve casing said diaphragm having an opening in the center, a cylindrical pressure cap mounted over said opening; a conduit from the valve casing extending through the opening in the diaphragm and terminating in a condensing chamber formed in the top of the pressure cap; said conduit permitting the pressure in the valve casing to enter the diaphragm chamber and preventing the water in said chamber from escaping therefrom and permitting of a limited static head of water on the under side of the diaphragm.

3. In a steam pressure regulating valve having a valve casing with a reversible puppet valve therein, a diaphragm and its casing secured to the top of the valve casing, said diaphragm having an opening in the center, a cylindrical pressure cap mounted over said opening and a conduit from the valve casing extending through the opening in the diaphragm and terminating in a condensing chamber formed in the top of the pressure cap; said conduit permitting the pressure in the valve casing to enter the diaphragm chamber and preventing the water in said chamber from escaping therefrom; and permitting of a limited static head of water on the under side of the diaphragm.

4. In a steam pressure regulating valve, the combination of a valve casing with a therein contained valve, a diaphragm chamber above the valve casing, a diaphragm in said chamber, said diaphragm having an opening through its center, with a cylindrical pressure cap mounted over said opening and securely clamped to the inner edge of the diaphragm, said pressure cap being connected with a reversible puppet which controls the passages in the valve casing; a conduit extending from the valve casing through the opening in the diaphragm and terminating in a condensing chamber formed in the top of the pressure cap; said conduit permitting the pressure in the valve casing to enter the diaphragm chamber and preventing the water in said chamber from escaping therefrom, and permitting the maintaining of a limited static head of water on the under side of said diaphragm and means for applying a yielding force to the upper side of the pressure cap to regulate the pressure in the diaphragm chamber.

In testimony whereof I have affixed my signature, in presence of two witnesses.

JAMES LEWIS KIMBALL.

Witnesses:
GEORGE MCANAUL,
LAURA V. DAVIS.

Copies of this patent may be obtained for five cents each, by addressing the "Commissioner of Patents, Washington, D. C."